US006604309B1

(12) United States Patent
Phua

(10) Patent No.: US 6,604,309 B1
(45) Date of Patent: Aug. 12, 2003

(54) ILLUMINATED DISPLAY AND A METHOD OF FORMING SAME

(76) Inventor: Swee Hoe Phua, Blk 97, Cashew Heights, Cashew Road #15-06, Singapore 679668 (SG)

( * ) Notice: Subject to any disclaimer, the term of this patent is extended or adjusted under 35 U.S.C. 154(b) by 0 days.

(21) Appl. No.: 09/381,391
(22) PCT Filed: Mar. 17, 1998
(86) PCT No.: PCT/SG98/00019
§ 371 (c)(1),
(2), (4) Date: Sep. 17, 1999
(87) PCT Pub. No.: WO98/41968
PCT Pub. Date: Sep. 24, 1998

(51) Int. Cl.⁷ .............................................. G09F 13/02
(52) U.S. Cl. .............................. 40/560; 40/615; 428/32
(58) Field of Search .......................... 362/103; 428/32; 40/615, 559, 560

(56) References Cited

U.S. PATENT DOCUMENTS

| 612,895 A | * 10/1898 | Downey ........................ 40/615 |
| 3,827,169 A | * 8/1974 | Chase et al. |
| 4,025,160 A | * 5/1977 | Martinez |
| 4,277,904 A | * 7/1981 | Leuthesser .................... 40/564 |
| 4,682,433 A | * 7/1987 | Stilling ........................ 40/615 |
| 5,030,498 A | 7/1991 | Okada et al. |
| 5,183,323 A | 2/1993 | Daniel |
| 5,322,869 A | * 6/1994 | Yamasaki et al. ............. 524/117 |
| 5,354,385 A | * 10/1994 | Hashimoto et al. .......... 136/251 |
| 5,371,657 A | 12/1994 | Wiscombe |
| 5,383,296 A | 1/1995 | Vecchione et al. ............. 40/604 |
| 5,440,464 A | * 8/1995 | Nowlin ...................... 40/546 X |
| 5,641,856 A | * 6/1997 | Meurs ......................... 525/428 |
| 5,655,324 A | * 8/1997 | Siener, Jr. et al. ............. 40/615 |
| 5,741,616 A | * 4/1998 | Hirano et al. ................ 399/286 |
| 6,004,002 A | * 12/1999 | Giannone .................. 40/559 X |

FOREIGN PATENT DOCUMENTS

| EP | 525 773 | 2/1993 | |
| FR | 2165026 | * 8/1973 | ................ 40/615 |
| GB | 2248208 | 4/1992 | |
| WO | WO 88/08601 | 3/1988 | |

* cited by examiner

Primary Examiner—Anthony Knight
Assistant Examiner—Alison K. Pickard
(74) Attorney, Agent, or Firm—Merchant & Gould P.C.

(57) ABSTRACT

An illuminated display for use as an advertising medium is provided in the invention comprising a first layer of light transmissible material, a second layer of woven fabric, a third layer of light transmissible material bonded to the first layer of light transmissible material to sandwich the second layer of woven fabric, the second layer of woven fabric having printed or painted designs formed thereon for providing a display means (1) and a light source (2) for illuminating said printed or painted designs.

1 Claim, 3 Drawing Sheets

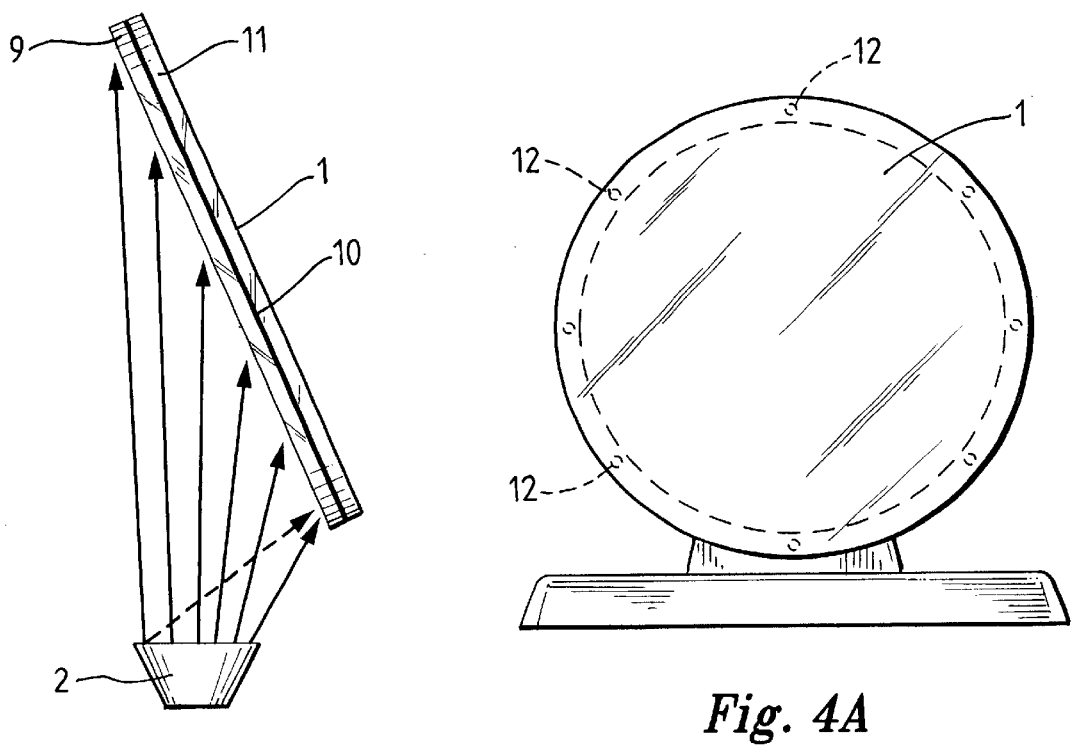
Fig. 3
Fig. 4A
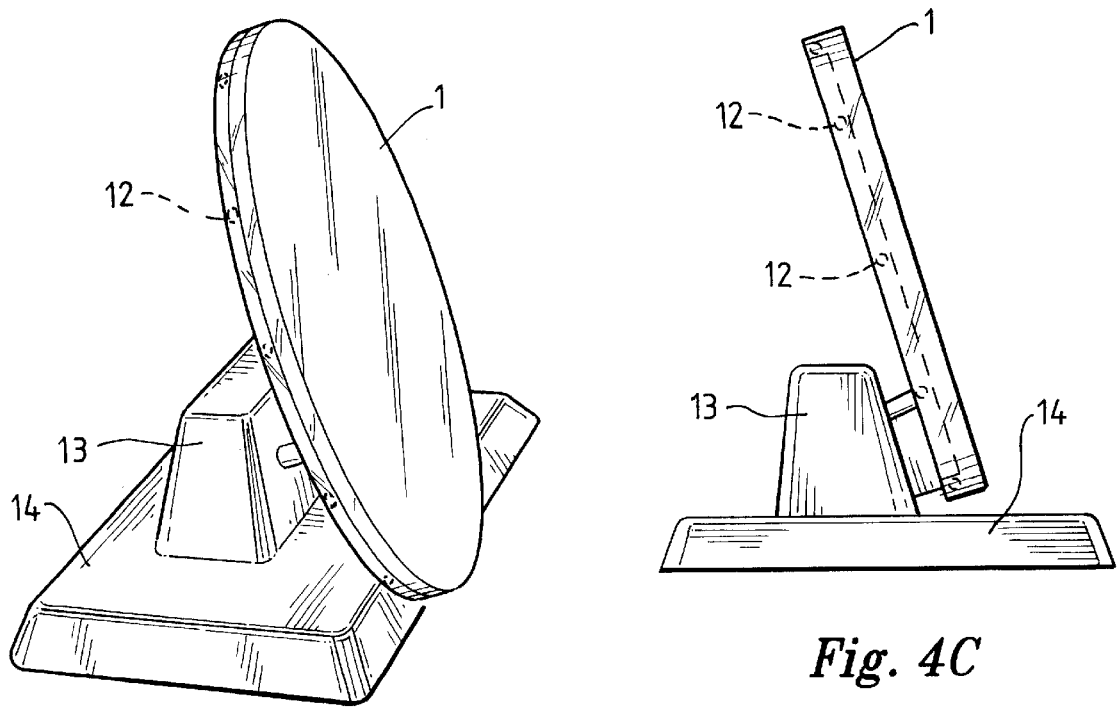
Fig. 4B
Fig. 4C

ILLUMINATED DISPLAY AND A METHOD OF FORMING SAME

The present invention relates to an illuminated display and method of forming same.

Displays and signs are usual forms of advertising media which can make use of the light transmitting properties of certain types of materials to enhance their visual appeal. Translucent plastics or stained glass are examples of such materials. When these materials are used in combination with light emanating sources, whether by applying direct or diffused backlighting, the effects thereof are usually visually pleasing or eye-catching. However, the inherent disadvantage of illuminated displays or signs which contain intricate designs and which are made of coloured translucent plastics or colour stained glass is that they are expensive to manufacture.

It is an object of the invention to provide an improved illuminated display.

In accordance with a first aspect of the present invention, there is provided an illuminated display comprising a first layer of light transmissible material, a second layer of woven fabric having a design formed thereon, a third layer of light transmissible material bonded to the first layer, and a light source for illuminating the design. It is preferred that at least one of the first and third layers of light transmissible materials comprise transparent plastics, or translucent plastics. It is also preferred that the second layer of woven fabric comprises a silk fabric having a design formed thereon, and the light source provides an oblique backlight, or a plurality of light sources arranged around the periphery of the illuminated display to provide edge-light.

In accordance with the second aspect of the present invention, there is provided a method of forming a display element comprising the steps of forming a first layer of light transmissible plastics, bonding a second layer of woven fabric having a design formed thereon to the first layer, and forming a third layer of light transmissible plastics and bonding the third layer to the first layer to sandwich the second layer. It is preferred that the first layer of light transmissible plastics is formed by injection moulding and the second layer of woven fabric is bonded to the first layer of transmissible plastics during said injection moulding. It is also preferred that the third layer of light transmissible plastics is formed by injection moulding and the first and third layers of light transmissible plastics are bonded during said injection moulding.

Embodiments of the invention will now be described, by way of example, with reference to the accompanying drawings in which:

FIG. 3 depicts the position of the source of illumination with reference to display panel 1 of the embodiment of FIG. 1.

FIGS. 4A, 4B and 4C depict the various views of the second embodiment of the invention.

Figure 1:
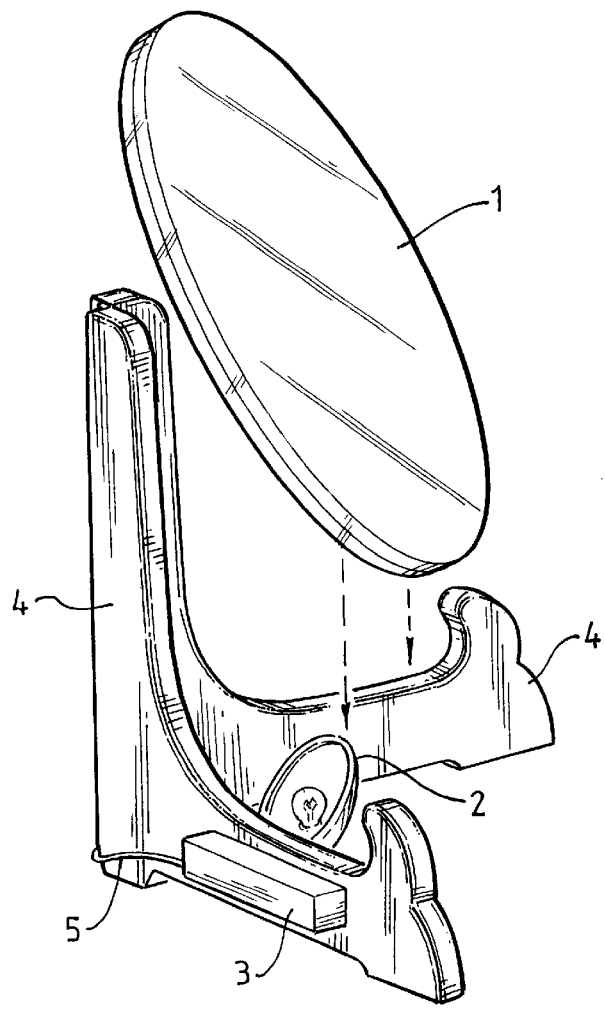
FIG. 1 is a perspective view of the first preferred embodiment of the invention.

A first preferred embodiment of the illuminated display is illustrated in FIG. 1 and comprises a display panel 1, a light source 2, a battery box 3 to power the light source 2, and a stand 4. In FIG. 1, the illuminated display is formed from the arrangement whereby the display panel 1 is mounted on the stand 4 at an inclined angle with the light source 2 positioned behind and below display panel 1 to provide an oblique backlight effect. The display panel 1 is made of two layers of transparent plastics and a layer of printed woven fabric found between said two layers of plastics, light emanating from the light source 2 being partially refracted, transmitted and reflected by the display panel 1. Consequently the desired patterns printed on the surface of the woven fabric will appear lustrous and radiant when viewed from the front. The method of forming the display panel 1 will be described hereinafter with reference to FIGS. 6 and 7.

Figure 2:
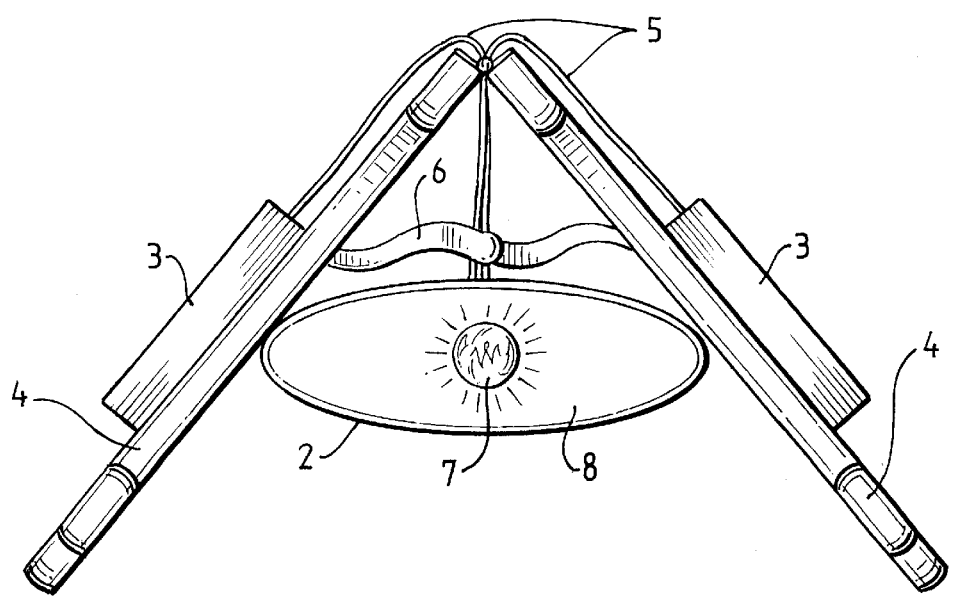
FIG. 2 is a plan view of the embodiment of FIG. 1.

As shown in FIG. 2, the light source 2 preferably comprises a standard light bulb 7 fitted with an elongated reflector 8, and is powered by batteries arranged in a standard electrical connection which are encased in battery boxes 3 affixed to the outer sides of stand 4, via the wires 5. Stand 4, which is preferably made of wood or plastics, consists of a pair of L-shaped panels connected together via hinges and an angle 6 to form a support arrangement which provides a raised inclined mounting position for the display panel 1. From the view offered by FIG. 2, it can also be seen that the reflector 8 of the light source 2 spans, in the direction along its elongated width, the maximum allowable width of the base of the stand 4, to provide an even distribution of reflected light from the light bulb 7 so that the total projected light from the light source 2 can cover the entire surface area of the display panel 1, which is at an inclined angle as mentioned hereinabove. As such, all parts of the display panel 1 can be illuminated.

Referring to FIG. 3, the display panel 1 has a first layer 9 made of polyacrylic, a second layer 10 comprising a silk fabric with a desired printed or painted design, and a third layer 11 made of the same polyacrylic as found in the first layer 9. As can be seen from FIG. 3, which also depicts the position of the light source 2 with respect to the display panel 1 from a side view, light rays from the light source 2 are projected upwards and enter the display panel 1 at various angles of incidence, all greater than zero. By this arrangement, the amount of direct transmitted light from the light source 2 would then be minimal and a person would not experience high levels of glare and reduced viewing contrast when looking at the display panel 1 from the front. The advantage of such an arrangement is that it allows the interplay of refracted, transmitted and reflected light as light passes through the first layer 9 made of polyacrylic, the second layer 10 comprising a silk fabric, and the third layer 11 made of the same polyacrylic as found in the first layer 9 of the display panel 1 so as to create a combination of effects to enhance the visual appeal of the printed or painted design on the second layer 10 made of silk. This is possible because the second layer 10 contains many small openings within its interwoven structure of silk threads and these openings behave as light apertures which allow light rays originating from the light source 2, which had been refracted at the interface between air and the first layer 9 made of polyacrylic, to be transmitted to the third layer 11 made of polyacrylic, and subsequently to the viewer. In addition to the transmitted light through the apertures in the second layer 10, light is also reflected off the shiny or reflective surfaces of the interwoven silk threads surrounding the same apertures, and into the viewing direction. As a consequence of this interplay of refracted, transmitted and reflected light, the printed or painted design of the second layer 10 of the display panel 1 will then appear to be glistening and radiant.

A second embodiment of the illuminated display is illustrated in FIGS. 4A, 4B and 4C. Essentially, the mode of operation of the second embodiment of the illuminated display is similar to that of the first embodiment described hereinabove. The main difference between the two embodiments lies in the position and type of light source used to illuminate the display panel 1. As shown in FIGS. 4A and 4C, the second embodiment uses a plurality of light emitting diodes 12 fitted or moulded into, and lined near the edge and around the periphery of the first layer 9 of the display panel 1 to provide illumination. In effect, the display panel 1 is edge-lit and this arrangement of lining the light emitting diodes 12 around the periphery of the display panel 1 allows an even distribution of light to be provided to all parts of the display panel 1. As a consequence a plurality of wires are required to connect the battery to the plurality of light emitting diodes 12. It is thus necessary, as shown in FIG. 4C, that the stand 14, the battery box 13 and the display panel 1 are conjoined to form a single fixture so as to allow the plurality of wires connecting the battery and the light emitting diodes 12 to run to the display panel 1 without affecting the aesthetics of the illuminated display.

Figure 5:
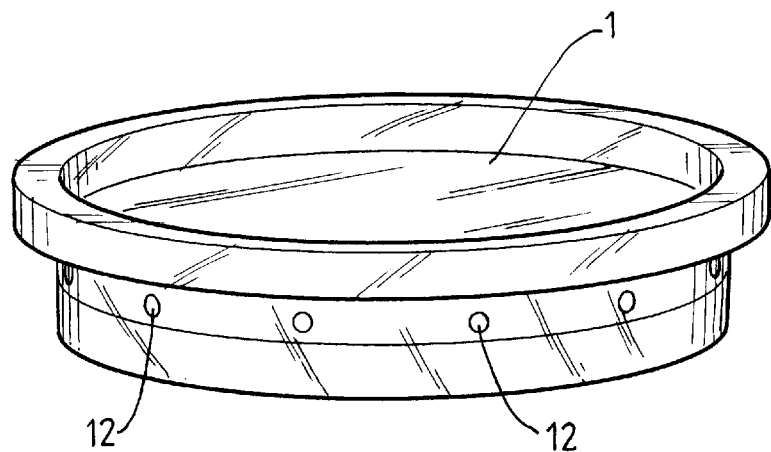
FIG. 5 is a perspective view of the third embodiment of the invention.

A third embodiment of the illuminated display, wherein the illuminated display is used as a coaster, is illustrated in FIG. 5. In this arrangement, a similar concept to that of the second embodiment of the illuminated display whereby a plurality of light emitting diodes 12 lined around the edge and around the periphery of display panel 1 to provide edge lighting is used. A smaller battery unit is required to power the light source in such an implementation so as to allow the illuminated display to be placed in a horizontal position to function as coaster.

Figure 6:
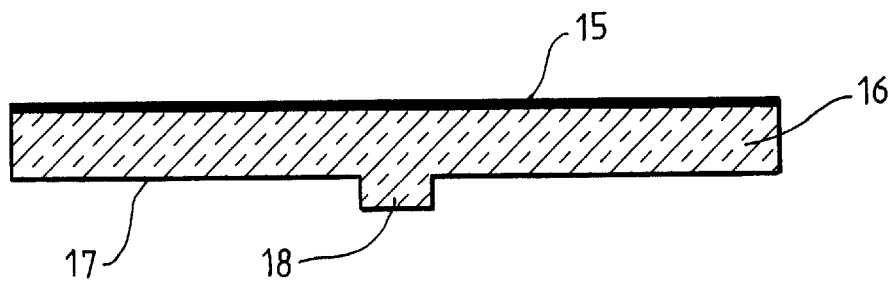
FIG. 6 is a cross sectional view of a partially complete display panel 1 of the embodiment of FIG. 5, made according to the first phase of an injection moulding process.
Figure 7:
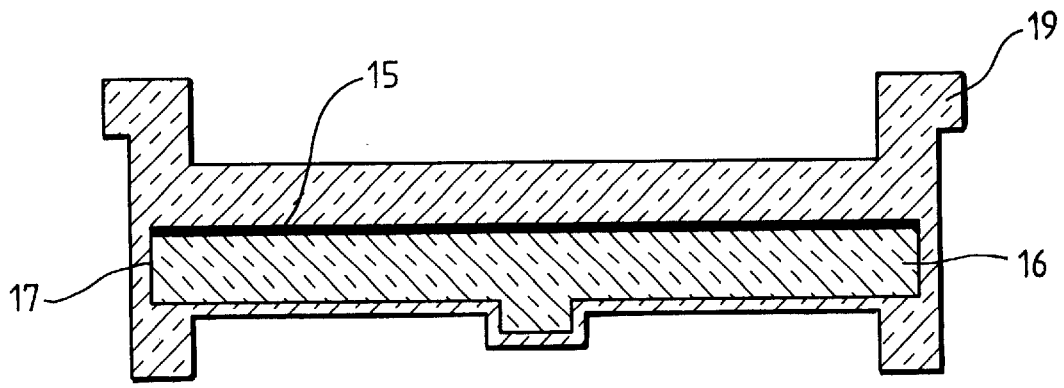
FIG. 7 is a cross sectional view of a complete display panel 1 of the embodiment of FIG. 5, made according to the second phase of an injection moulding process.

To form display panel 1, a method is described hereunder with the aid of FIGS. 6 and 7 to describe a two phase injection moulding process for the third embodiment of the illuminated display. In this example, however, the light emitting diodes 12 and the corresponding supply wires are omitted from the details of the formation process so that an injection moulding process common to all three embodiments can be described. Referring to FIG. 6, a woven fabric layer 15 preferably comprising a silk fabric which is printed with the desired designs is placed in a first injection mould (not shown) having a shape to produce the panel 17. Once the fabric layer 15 is placed in the mould, molten plastics, preferably molten polyacrylic, is then injected to fill the mould. As the molten plastics flow, it originates from an injection point 18 and moves outwards towards the edges of the panel 17, filling up the entire cavity of the mould. Since molten polyacrylic is adhesive, it therefore bonds on contact with the fabric layer 15 as it fills the cavity. Upon cooling, the panel 17 is produced with the fabric layer 15 firmly bonded to the polyacrylic layer 16.

To complete the formation of the display panel 1, the panel 17 is subsequently placed in a second injection mould (also not shown) having a shape to produce the display panel 1 of the third embodiment. Referring to FIG. 7, molten plastics of the same homogeneity as the molten plastics used in the first injection moulding process described hereinabove, is injected to fill the mould. As the molten plastics flows, it envelopes the panel 17 and homogenises with the polyacrylic layer 16, giving the desired shape as shown in the cross sectional view offered by FIG. 7. When cooled, the fabric layer 15 would then appear to be suspended in a moulded homogenous transparent plastics frame 19 (which now incorporates polyacrylic layer 16) made of polyacrylic. The finished display panel 1 can then be mounted onto a stand and illuminated by way of backlighting provided by a filament bulb, in the case of the first embodiment; or be illuminated by light emitting diodes fitted, or moulded by way of a further known secondary injection moulding process, into the homogenous plastics in the case of the second and third embodiment.

The embodiments of the invention are not to be construed as limitative. For example, the third embodiment of the illuminated display, while being used as a coaster, may have a normally-open contact switch connected to the electrical supply wiring and affixed onto the surface that comes into contact with the bottom of a glass or cup. Upon the setting down of the glass or cup onto the coaster, the contact switch will close and complete the electrical connection to supply the light emitting diodes 12 with power, and hence illuminates said coaster. In another example, the wires as described in the second and third embodiments of the invention hereinabove may be replaced with current conducting tracks printed onto the surfaces of the display panel 1 by known techniques. As a further example, the first layer 9 and the third layer 11 of the display panel 1 may be made of any light transmissible material which includes transparent, translucent, frosted, or tinted plastics, or glass. Furthermore, the design may also be formed on the second layer 10 of the display panel 1 by way of stitching or weaving, or by way of bonding a supplementary material, such as a compressed desiccated flower, by using known methods, to said second layer 10. Still further, the display panel 1 may be made of two layers of light transmissible materials and a layer of woven fabric having a design formed thereon found between said two layers of transmissible materials by using a transparent adhesive to bond all the layers together.

What is claimed is:

1. A method of forming a display element using a multi-stage injection moulding process, comprising the steps of:

placing a layer of woven fabric having a design formed thereon into a first mould having a shape for producing a first panel;

injecting plastics material into the first mould thereby bonding a first layer of light transmissible plastics material to the layer of woven fabric in a first injection moulding process to create the first panel;

placing the first panel into a second mould having a shape for producing a second panel having a size different than that of the first panel; and injecting plastics material into the second mould thereby bonding a second layer of light transmissible plastics material to the first layer and the layer of woven fabric in a second injection moulding process to sandwich the layer of woven fabric to create the second panel.

* * * * *

UNITED STATES PATENT AND TRADEMARK OFFICE
CERTIFICATE OF CORRECTION

PATENT NO. : 6,604,309 B1
DATED : August 12, 2003
INVENTOR(S) : Phua

It is certified that error appears in the above-identified patent and that said Letters Patent is hereby corrected as shown below:

<u>Title page,</u>
Insert Item -- [73] Assignee: Mold Technic Pte Ltd., Singapore --

Signed and Sealed this

Second Day of November, 2004

JON W. DUDAS
*Director of the United States Patent and Trademark Office*